(12) United States Patent
Mraz

(10) Patent No.: US 7,085,923 B2
(45) Date of Patent: Aug. 1, 2006

(54) HIGH VOLUME SECURE INTERNET SERVER

(75) Inventor: Ronald Mraz, South Salem, NY (US)

(73) Assignee: International Business Machines Corporation, Armonk, NY (US)

(\*) Notice: Subject to any disclaimer, the term of this patent is extended or adjusted under 35 U.S.C. 154(b) by 738 days.

(21) Appl. No.: 09/874,813

(22) Filed: Jun. 5, 2001

(65) Prior Publication Data
US 2002/0184489 A1 Dec. 5, 2002

(51) Int. Cl.
*H04L 9/00* (2006.01)

(52) U.S. Cl. ............... 713/156; 713/153; 713/171; 713/169; 380/28; 380/278; 380/283

(58) Field of Classification Search ........... 713/156, 713/153, 171, 169; 380/28, 278, 283
See application file for complete search history.

(56) References Cited

U.S. PATENT DOCUMENTS 6,681,327 B1 \* 1/2004 Jardin .................. 713/153

OTHER PUBLICATIONS

Matsumoto et al, Speeding Up Secret Computations with Insecure Auxiliary Device, 1990, Springer-Verlag, pp. 497-498.\*

\* cited by examiner

*Primary Examiner*—Kim Vu
*Assistant Examiner*—Paula Klimach
(74) *Attorney, Agent, or Firm*—Duke W. Yee; Mark Wardas; Wayne P. Bailey (57) ABSTRACT

A distributed data processing system, computer program product, and method of efficiently serving secure network transactions is disclosed. The present invention achieves efficiency and scalability by distributing the work load involved in secure network communications among three classes of servers, inline crypto engines for performing encryption and decryption, dedicated handshake engines for establishing cryptographic parameters, and transaction servers for actually servicing the transactions. The server system can be scaled so that more resource-intensive operations, such as the handshaking procedure, can be distributed across a larger number of servers than less resource-intensive operations. In addition, an added benefit is realized by having transaction servers operate on unencrypted data in that a packet-sniffing firewall or site-wide web document caching system may be implemented, whereas such features were previously unavailable to secure Internet sites.

53 Claims, 5 Drawing Sheets

HIGH VOLUME SECURE INTERNET SERVER

BACKGROUND OF THE INVENTION

1. Technical Field

The present invention is directed generally towards a high volume cryptography-enabled Internet servers. More specifically, the present invention is directed toward a high-volume Internet server system that achieves high performance and scalability by distributing loads according to task.

2. Description of Related Art

Since the introduction of the World Wide Web and the subsequent commercialization of the Internet, the world has become a considerably more connected place. No longer bound to the primitive communications interfaces of the past, the Internet is now host to a variety of powerful communications media, including interactive hypertext browsing (the World Wide Web), instant messaging, streaming video and audio, and multimedia electronic mail.

Hypertext is a method of organizing textual and graphical information on a computer screen. Information is organized into "pages," which resemble printed pages in a book or (perhaps more accurately) printed scrolls (since a hypertext page can be of any length). The primary difference between hypertext and the printed word, however, lies in the fact that hypertext pages can contain links. That is, a portion of a hypertext document, such as a phrase or a graphic, may be made sensitive to clicking by the mouse such that when the user clicks on that portion, the user is directed to a new page or a different section of the current page. For instance, it is a common practice to make bibliographic citations into links. When a user clicks on one of these citations, the cited text appears on the screen. Hypertext documents are displayed using a program called a "browser."

The largest and best-known repository of hypertext documents is the World Wide Web, a loosely bound collection of publicly accessible hypertext documents stored on computers the world over. The World Wide Web has become the preferred Internet medium for publishable information as well as for providing such interactive features as online shopping—to the extent that the terms Internet and World Wide Web are virtually synonymous to some.

Browsers can download hypertext documents from a server with the HyperText Transfer Protocol (HTTP), described in Internet Request for Comments (RFC) 2616. HTTP allows a browser to request documents or files from a server and receive a response. In addition, when browser users enter information into a form embedded into a hypertext page, the browser transmits the information to a server using HTTP. Form information can then be passed along to applications residing on the server by way of the Common Gateway Interface (CGI). Those applications can then return a result, which may be written in HTML.

The Internet, and in particular the World Wide Web, is now a host to a variety of different types of data communications outside of the traditional text and hypertext models. Streaming data transmissions allow video and audio to be transmitted, even as a real-time broadcast, through the Internet. Structured data communications formats such as eXtensible Markup Language (XML) allow data files of varying information content and type to be sent in a standardized form that is easily read and interpreted by computers and human operators both.

The flexibility of the World Wide Web as a communications medium for publishing information and as an interface to network-based applications makes it a convenient platform for providing commercial and other services online. In the case of some services, especially when credit card or other monetary transactions are involved, however, an increased level of security is required. Network transmissions are easily intercepted and read without the use of some kind of cryptography to shield sensitive information from prying eyes.

To make online transactions more secure, network cryptographic communications protocols such as SSL (secure sockets layer) have been developed. SSL, described in detail in U.S. Pat. No. 5,657,390, establishes a secure channel of network transmissions that cannot be decoded by third parties. SSL utilizes a secure handshake procedure to establish cryptographic keys between parties to a network communication. Once the keys are established, the parties transmit encrypted data between themselves. Periodically, the handshake must be repeated as the cryptographic keys expire after a period of time. HTTP connections established using the SSL encryption system are known as HTTPS connections.

This arrangement works well for small-scale server operations with short, infrequent transactions. In the case of large-scale operations that must serve many transactions (such as the Internal Revenue Service or other large governmental agency), or operations that must make continuous secure communications over an extended period of time (such as an online stockbroker sending real-time stock quotes), however, the enormous overhead in computing time associated with encryption, decryption, and handshaking can significantly reduce the performance of a server system.

A need exists, therefore, for a server system capable of efficiently serving a large number of continuous transactions.

SUMMARY OF THE INVENTION

The present invention provides a distributed data processing system, computer program product, and method of serving secure network transactions in an efficient manner. The present invention achieves efficiency and scalability by distributing the work load involved in secure network communications among three classes of servers, inline crypto engines for performing encryption and decryption, dedicated handshake engines for establishing cryptographic parameters, and transaction servers for actually servicing the transactions. The server system can be scaled so that more resource-intensive operations, such as the handshaking procedure, can be distributed across a larger number of servers than less resource-intensive operations. In addition, an added benefit is realized by having transaction servers operate on unencrypted data in that a packet-sniffing firewall or site-wide web document caching system may be implemented, whereas such features were previously unavailable to secure Internet sites.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
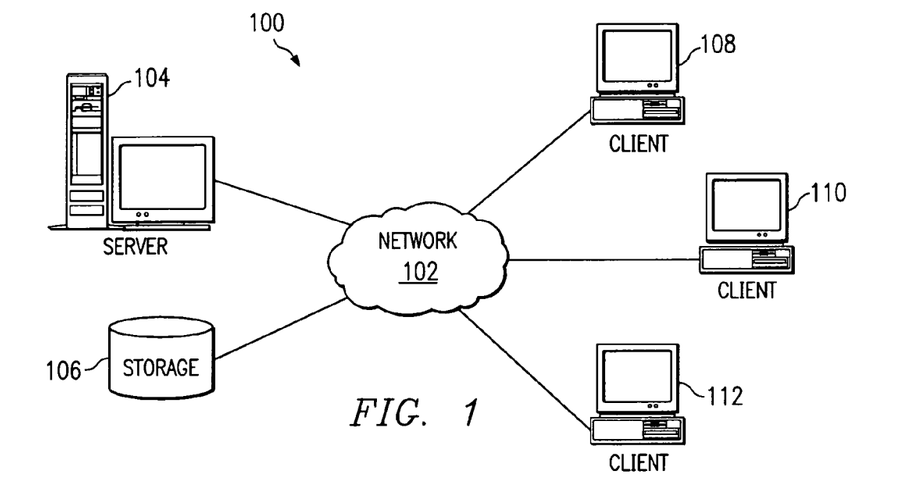
FIG. 1 is a diagram of a networked data processing system in which the processes of the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
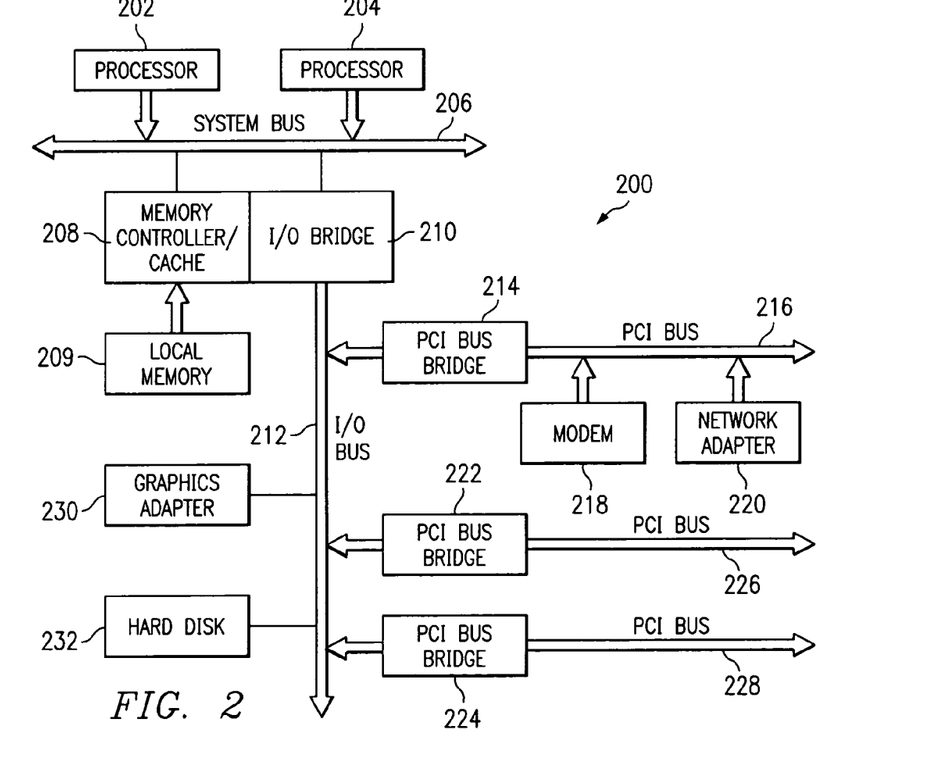
FIG. 2 is a block diagram of a server in which the processes of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCD bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
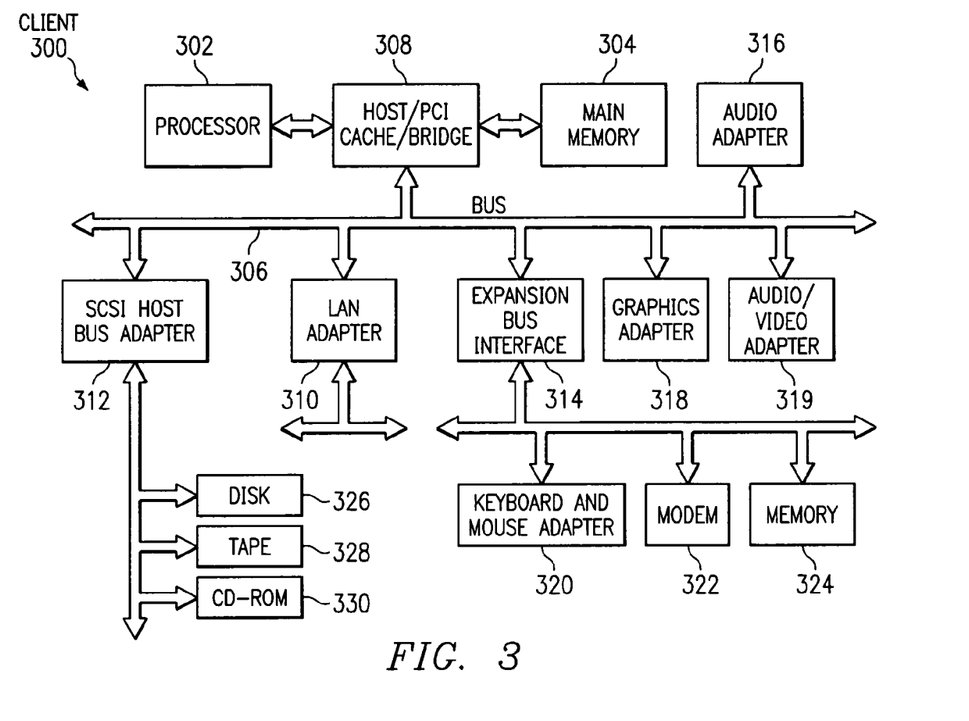
FIG. 3 is a block diagram of a client which may be used to communicate with one or more servers in a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
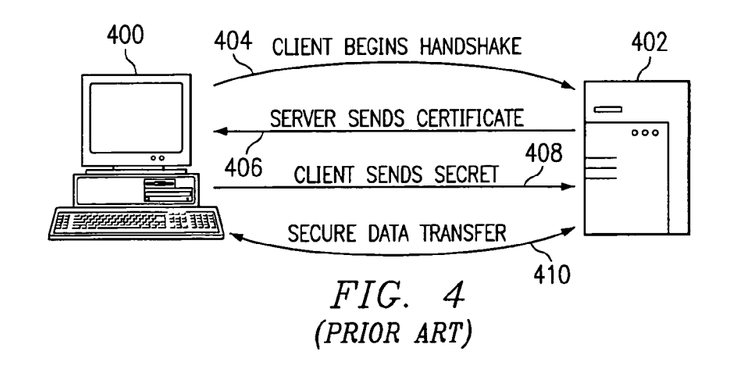
FIG. 4 is a diagram depicting a Secure Sockets Layer (SSL) handshaking procedure in accordance with a preferred embodiment of the present invention.

FIG. 4 is a diagram depicting the operation of a secure sockets layer (SSL) interface between a client 400 and a server 402. SSL is described in detail in U.S. Pat. No. 5,657,390. SSL allows data to be exchanged between client 400 and server 402 over a conventional TCP/IP or other streaming network connection in an encrypted form without either of client 400 and server 402 having any advance knowledge of cryptographic keys.

Creating and maintaining an SSL connection between client 400 and server 402 requires two basic operations to be performed between the two machines. One is a handshake procedure, which must be performed at the beginning of the SSL connection, and periodically thereafter so as to increase security by periodically changing keys. The handshake procedure establishes cryptographic parameters, including the cryptographic keys that will be used to encrypt and decrypt information exchanged between client 400 and server 402. The second procedure is the encrypted data transfer itself. The machine sending the data encrypts the data with a cryptographic key and transmits the encrypted data to the other machine, which decrypts the data with a cryptographic key (either the same one, or a different one, depending on the type of cryptography used). Other cryptographic parameters that may be established between systems communicating over a secure channel (whether they use SSL or not) include the type of cryptosystem to be used, the strength of the encryption (often specified in terms of the length of the cryptographic keys to be used), under what circumstances do the keys change (e.g., how often are the keys updated), under what protocol are keys to be established.

SSL relies on public key cryptography to exchange cryptographic keys between machines. In a public key cryptosystem, such as the RSA cryptosystem described in U.S. Pat. No. 4,405,829, each party to the communication has two keys, a public key and a private key. The public key is used to encrypt messages. The encrypted messages can only be decrypted using the corresponding private key. In a public key cryptosystem, the parties exchange public keys, but keep the private keys secret. In this way, each of the parties can encrypt messages to send to the other party, and only the intended recipient will be able to decrypt the message. Note that public keys need not be exchanged in any secure way, since a public key by itself is not enough to recover an encrypted message.

As an example, suppose that two parties wish to use public-key cryptography to communicate through electronic mail. First, each of the parties generates a public-private key pair. Next, the parties send each other their public keys through electronic mail (which may be intercepted by a third party), but keep their private keys secret. Then, if one of the parties wishes to send an encrypted message to the other, the sending party uses the recipient party's public key to encrypt the message before transmission. The recipient party can then use its private key to recover the original message.

In contrast to public key cryptography, conventional block ciphers, such as DES (data encryption standard), described in U.S. Pat. No. 3,962,539, use a single key for encryption and decryption. For a conventional cipher such as DES to be effective, both parties must be in possession of the same key. It follows that such key must be communicated between the parties in some secure fashion.

SSL may make use of either public-key or conventional cryptography when securely transmitting data. In either case, however, the keys are established between the parties by using a public-key cryptosystem. The public-key cryptosystem establishes a secure communications channel for exchanging a conventional cryptographic key, which can then be used perform the bulk of the data encryption and decryption thereafter. This scheme, in which a public-key cryptosystem is used to establish a conventional cryptographic key, is advantageous in that the secure key exchange ability of public-key cryptography is coupled with the speed and enhanced security of a conventional cryptosystem.

Turning now to FIG. 4, client 400 initiates (404) the handshake procedure with server 402. In reply, server 402 returns a certificate (406) to client 400. The certificate contains information about the identity of the server and also contains a public key of the server. Client 400 can then verify the identity of server 402 by inspecting the certificate. Client 400 generates a "master secret," which is a piece of information (usually some kind of random or pseudo-random number) that can be used to derive cryptographic keys. Client 400 uses server 402's public key to encrypt the master secret and sends (408) the secret to server 402. Server 402 uses its private key to decrypt the master secret. At this point, both client 400 and server 402 are in possession of the same master secret.

The master secret can then be used as a "seed" for client 400 and server 402 to use to generate cryptographic keys. Many cryptosystems make use of random numbers as an input to key-generation algorithms; thus, the master secret may be used as a random number in such algorithms. How many keys are generated and how those keys are generated is dependent on what type of encryption will be used for data transmission.

Although SSL must rely on some form of public-key cryptography in its handshake procedure, SSL may use any of a number of cryptosystems (called "cipher suites" in SSL parlance) for data transmission. Cipher suites supported by SSL include DES (data encryption standard), 3DES (triple DES), DSA (digital signature algorithm), KEA (key exchange algorithm), MD5 (message digest algorithm 5), RC2 (Rivest cipher 2), RC4 (Rivest cipher 4), RSA (Rivest, Shamir, and Adleman) public-key algorithm, RSA key exchange, SHA-1 (secure hash algorithm), and SKIPJACK. Note that some of these cipher suites are suitable for handshaking, while others are suitable for data transmission. RSA is commonly used for handshaking, and RC4 is commonly used for data transmission, for example.

Once keys have been established between client 400 and server 402, the keys may be used to encrypt and decrypt information transmitted (410) between client 400 and server 402. Periodically, the handshake procedure will be repeated so as to establish a new set of cryptographic keys. Periodically changing keys enhances security, because it lowers the amount of information transmitted using any one key. A cipher becomes easier to break, the more encrypted information a cryptanalyst has access to. Periodically changing keys ensures that only a small amount of information is encrypted with any one cipher.

Figure 5:
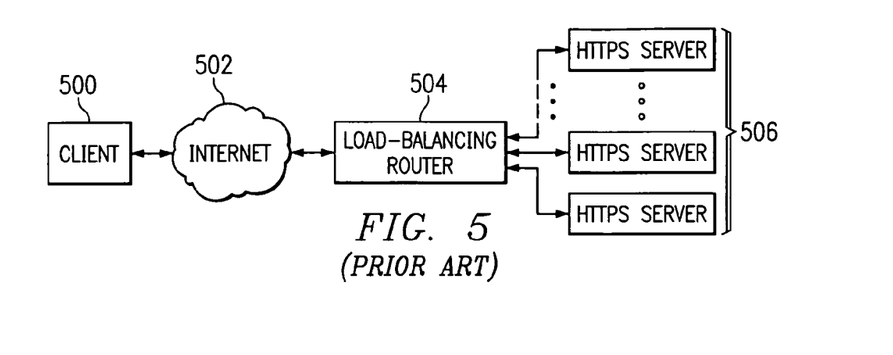
FIG. 5 is a block diagram of a typical secure distributed web server system.

When SSL is used for securely exchanging information in a World-Wide Web context, multiple web servers (a "server farm") may be used to distribute the burden of serving large volumes of web pages across several machines. FIG. 5 depicts a typical arrangement for distributing a web-serving load across a number of servers. Client 500 submits an HTTPS (HTTP with SSL) request through Internet 502, which is received by load-balancing router 504. Load-balancing router 504 forwards the request to one of HTTPS servers 506, which services the request. This and a number of other load-balancing arrangements are discussed with respect to HTTP (without SSL) in Gupta and Reddy, *A Client Oriented, IP Level Redirection Mechanism*, Proc. of IEEE Infocom Conf. (March 1999).

The load-balancing arrangement in FIG. 5 suffers from a number of serious drawbacks, however. One is that each of HTTPS servers 506 must not only serve pages, but must also perform SSL handshaking and encryption/decryption. Although performed relatively infrequently, SSL handshaking is a very time-consuming process. Performing SSL handshaking and encryption/decryption on the same server as serves pages can reduce the throughput of a single server by a significant amount. Despite the best load-balancing efforts, this combined SSL processing and web serving is still very inefficient.

Another problem that the system in FIG. 5 suffers from is that only HTTPS servers 506 are able to interpret information received from client 500. This is a problem in at least two circumstances. One is the situation in which a "packet-sniffing" firewall is to be used. A "packet-sniffing" firewall is a combination of hardware and software that intercepts network information being received by the server farm and rejects reception of suspicious incoming data (such as a denial of service attack, for instance). In FIG. 5, however, no such packet-sniffing firewall can be used, since the encrypted data received from client 500 cannot be decoded and examined before being forwarded to HTTPS servers 506. Another situation in which this is a problem is when site-wide caching is desired. In non-encrypted HTTP server farms, recently accessed pages can be "cached" in the memory of a router or other server for quicker access when requested. In FIG. 5, however, it is not possible for a cache server or router to cache transmitted pages for quick access, because the page is transmitted only in encrypted form, in which it can be decrypted only by its originally-intended recipient using that recipient's then cryptographic key.

Figure 6:
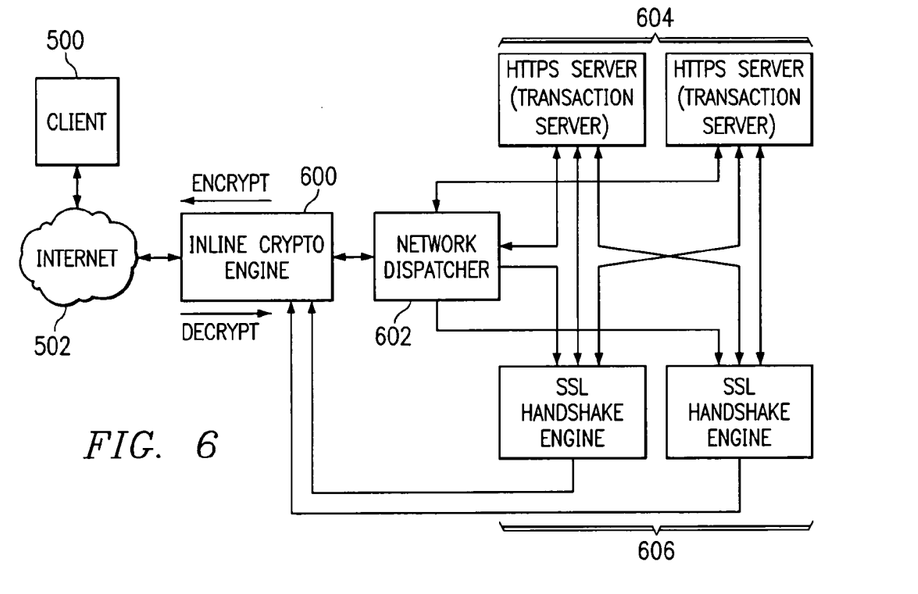
FIG. 6 is a block diagram of a secure distributed web server system in accordance with a preferred embodiment of the present invention.

FIG. 6 is a diagram of an improved system for serving documents with SSL in accordance with a preferred embodiment of the present invention. Client 500 is connected through Internet 502 to inline crypto engine 600, which decrypts incoming traffic from client 500 and encrypts outgoing traffic to client 500. Network dispatcher 602 takes HTTPS requests from inline crypto engine 600 and forwards them to an appropriate one of transaction servers 604, which are modified HTTPS servers. Transaction servers 604 hand off their network connection to client 500 to SSL handshake engines 606. Handshake engines 606 are special purpose servers that perform the SSL handshake procedure described in FIG. 4. Such handshaking takes place at the beginning of a secure communication and periodically thereafter as the cryptographic keys need to be updated. Thus, in a preferred embodiment of the present invention, the work of handshaking, encryption/decryption, and web page serving is divided among three sets of physical servers operating concurrently and asynchronously.

Note that in FIG. 6, a packet sniffing firewall can be interposed between inline crypto engine 600 and network dispatcher 602, since the data flowing between these two components is unencrypted. Also, a site-wide cache could be interposed between network dispatcher 602 and transaction servers 604, since the information flowing between network dispatcher 602 and transaction servers 604 is also unencrypted.

Figure 7:
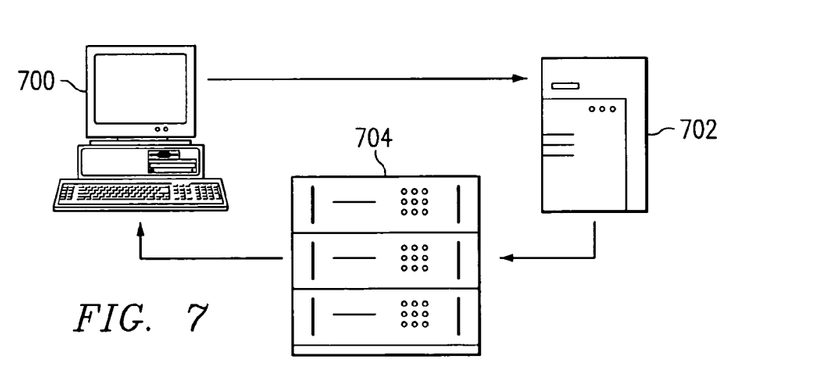
FIG. 7 is a block diagram depicting the operation of handing off a network connection from one networked machine to another in accordance with a preferred embodiment of the present invention.

FIG. 7 depicts a process of handing off a network connection in accordance with a preferred embodiment of the present invention. Client 700 establishes a TCP/IP connection with server 702. TCP/IP, although it gives the appearance of transmitting a continuous stream of data, actually breaks the transmitted data down into packets, which are managed by the TCP (transmission control protocol) portion of the TCP/IP protocol suite. Server 702 can "hand off" its connection with client 700, therefore, by directing substitute server 704 to respond to machine 700 with TCP packets, just as if substitute server 704 was actually server 702 (by "forging" server 702's IP network address). A more detailed description of this "handing off" process is provided in Song, Levy-Abegnoli, Iyengar, and Dias, *Design Alternatives for Scalable Web Server Accelerators*, Proc. of IEEE International Symposium on Performance Analysis of Systems and Software (April 2000).

Figure 8:
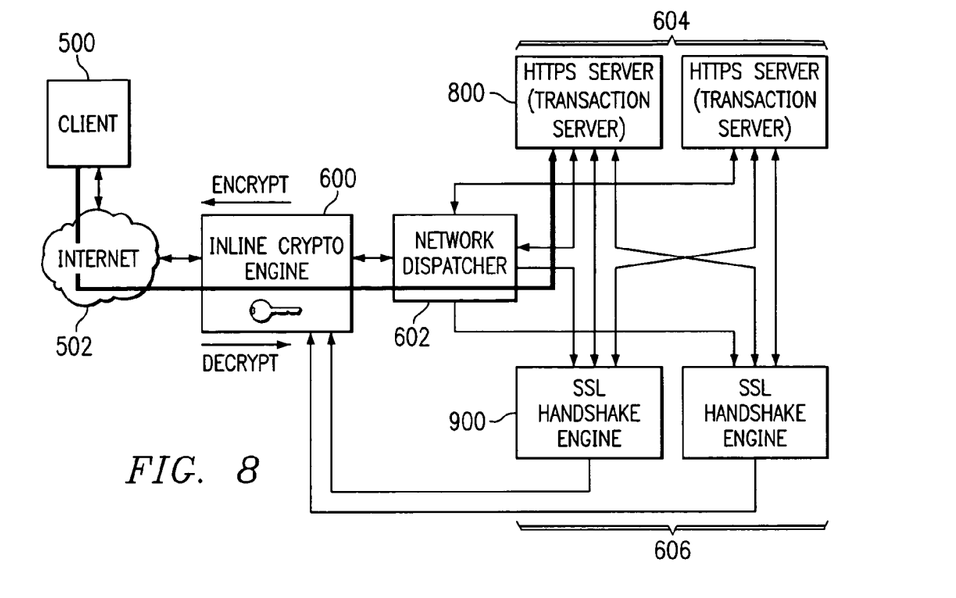
FIGS. 8–10 are block diagrams depicting a process of servicing secure web requests in a preferred embodiment of the present invention.
Figure 9:
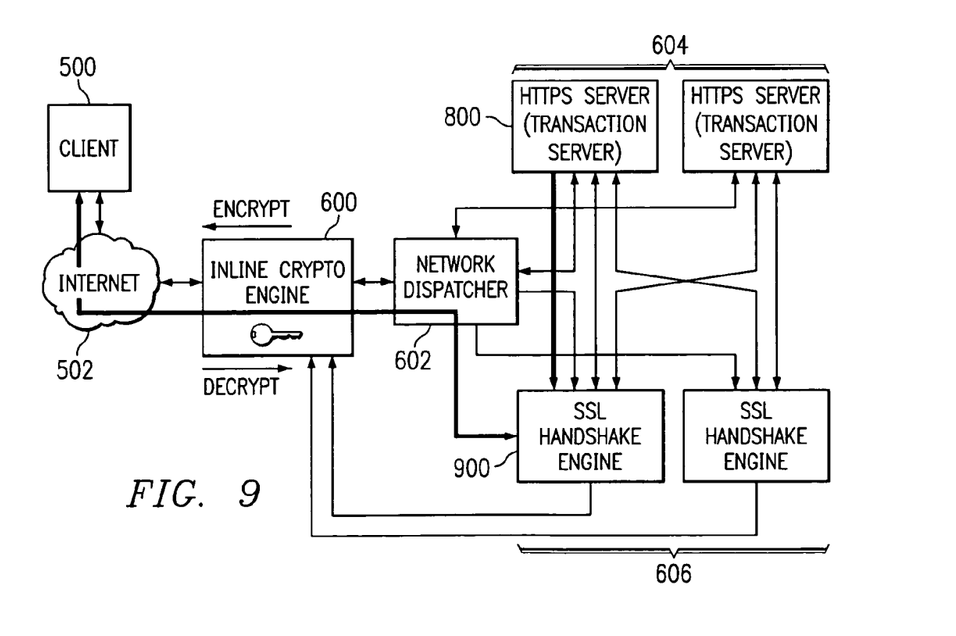
Figure 10:
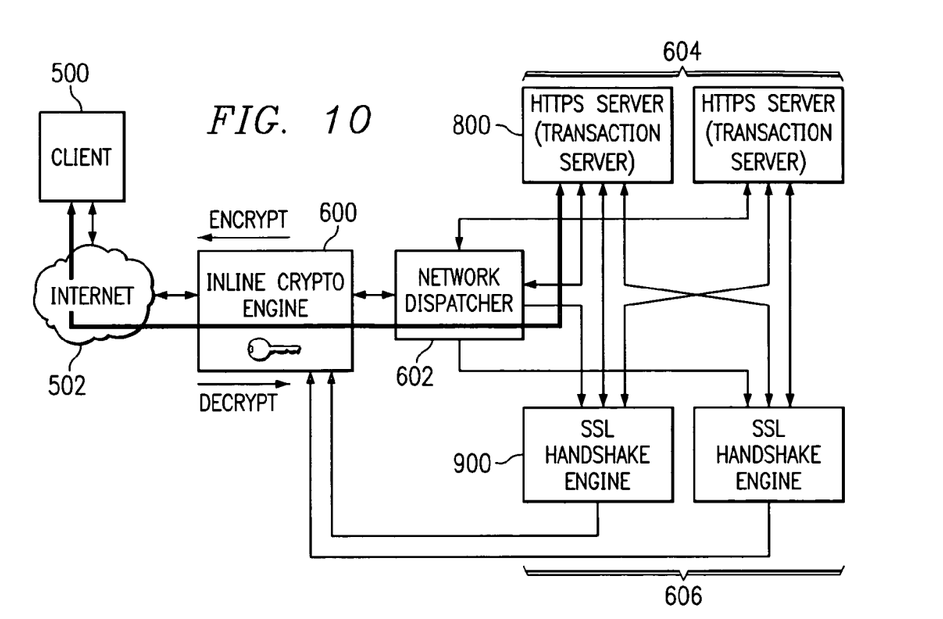

FIGS. 8–10 depict a process of serving web pages through SSL in accordance with a preferred embodiment of the present invention. In FIG. 8, client 500 sends an HTTPS request through Internet 502 to inline crypto engine 600. Assuming that client 500 has not had any previous contact with inline crypto engine 600, inline crypto engine 600 will simply pass the request through without performing any decryption, since no cryptographic keys have been established between inline crypto engine 600 and client 500. Network dispatcher 602 forwards the request to transaction server 800 (one of transaction servers 604), so as to distribute the web-serving load across transaction servers 604.

Turning now to FIG. 9, transaction server 800, recognizing that a handshake procedure must be executed to begin secure data transmission, hands off its connection to SSL handshake engine 900. SSL handshake engine 900 performs the handshake procedure with client 500 via network dispatcher 602, inline crypto engine 600, and Internet 502. SSL handshake engine 900 then forwards the proper cryptographic keys to inline crypto engine 600, and hands off its connection back to transaction server 800. Finally, in FIG.

10, client 500 and transaction server 800 carry on communications over an encrypted channel, using inline crypto engine 600 to encrypt and decrypt transmitted and received data, so that transaction server 800 deals only in plain HTML. Inline crypto engine 600 keeps a table of active SSL sessions and can identify the proper cipher (keys and cryptosystem) to use by observing source and destination IP network addresses. Thus, inline crypto engine 600 can encrypt and decrypt transmitted data between a number of client-server pairs.

Figure 11:
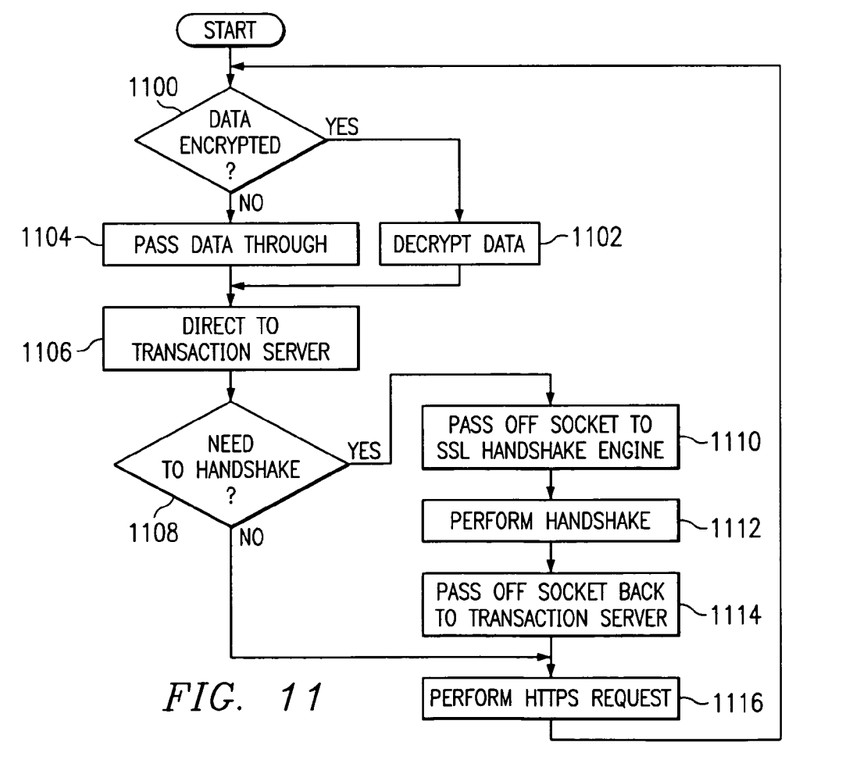
FIG. 11 is a flowchart representation of a process of servicing secure network transactions in a preferred embodiment of the present invention.

FIG. 11 is a flowchart representation of a process of serving web pages in a preferred embodiment of the present invention. First a received HTTPS request is checked to see if it is encrypted (step 1100). This can be done by checking a table of network connections parameters to see if the current client is listed as encrypted. If the request is encrypted, it is then decrypted by an inline crypto engine using a dedicated set of keys for a specific algorithm referenced in this lookup table (step 1102). If not, it is passed through the engine unchanged (step 1104). Next, the request is directed to an appropriate transaction server (step 1106). The transaction server then determines whether the handshake procedure must be performed, either because the cryptographic keys being used have expired or because cryptographic keys have not yet been established (step 1108). Cryptographic key expiration may be governed by one of any number of timing arrangements and controlled by either a server component or by the client.

If handshaking must take place, the transaction server passes off its network connection to an available SSL handshake engine (step 1110). The SSL handshake engine performs the handshake and informs the inline crypto engine of the established passwords (step 1112). Then, the engine passes its connection back to the transaction server (step 1114). The transaction server performs the HTTPS request by merely returning unencrypted data, leaving the encryption and decryption of the request to the inline crypto engine (step 1116). Finally, the process cycles to step 1100 to await the next request.

One of ordinary skill in the art will appreciate that many variations in the invention as described here are possible. For instance, the present invention may be implemented so as to utilize the TLS (transport layer security) protocol outlined in Internet RFC 2246, rather than SSL, as TLS functions similarly to SSL and is intended to replace SSL in the future. TLS uses a handshaking procedure similar to that of SSL.

It should also be noted that although the depicted example included equal numbers of handshake engines and transaction servers, in practice the number of handshake engines will exceed the number of transaction servers by one or two orders of magnitude. This is because the handshaking procedure is so resource-consuming. A handshake engine will generally be able to service significantly fewer connections than a transaction server. As long as a sufficiently high ratio of handshake engines to transaction servers is maintained, the server system of the present invention is easily scalable to meet usage demands. In addition, it is also possible to have multiple inline crypto engines operating in parallel so as to accommodate larger loads.

Likewise, it is also possible to have multiple inline crypto engines operating in series. Using multiple inline crypto engines in series allows transmissions within the server system to be encrypted as well for enhanced security. For example, a first inline crypto engine could decrypt information from the client then re-encrypt the client information using a more secure, but less easily negotiated cryptographic scheme such as a one-time pad, for long distance transport via satellite, for instance. A second inline crypto engine could then finally decrypt the data for use. One of ordinary skill in the art will recognize that a similar process may be employed for transmitting data from the server to the client or through an even greater number of inline crypto engines.

A possible performance optimization that may be employed within an embodiment of the present invention is to allow direct handoff from the network dispatcher to the handshake engine. In such an embodiment, the network dispatcher, sensing that an initial handshake is about to occur, hands off its network connection from the inline crypto engine to a handshake engine, thus bypassing the transaction server during this initial handshake. This scheme can result in a performance increase, at least at the time of the initial handshake in an SSL connection.

It is also important to note that the present invention is not limited to use in serving web transactions. The present invention may be used in any situation in which a large number of secure network transactions must be serviced.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of servicing secure transactions in a network, comprising:

establishing cryptographic parameters in a handshake engine;

servicing a transaction in a transaction server using unencrypted data;

utilizing an inline crypto engine and the cryptographic parameters established by the handshake engine to perform at least one of encryption associated with transmitted data and decryption associated with transmitted data, the inline crypto engine having capability for performing at least one of encryption and decryption of data;

wherein the establishing step includes handing off a network connection from the transaction server to the handshake engine such that the handshake engine can establish the cryptographic parameters with a client coupled to the network.

2. The method of claim 1, wherein the inline crypto engine performs decryption on the transmitted data to obtain the unencrypted data.

3. The method of claim 1, wherein the inline crypto engine performs encryption on the unencrypted data to obtain the transmitted data.

4. The method of claim 1, wherein the servicing step includes handing off a network connection from the handshake engine to the transaction server.

5. The method of claim 1, wherein the establishing step includes performing a Secure Sockets Layer (SSL) handshake procedure.

6. The method of claim 1, wherein the establishing step includes performing a Transport Layer Security handshake procedure.

7. The method of claim 1, wherein the transaction is returning at least one of a data file and streaming data.

8. The method of claim 7, wherein the streaming data includes at least one of audio data and video data.

9. The method of claim 7, wherein the data file includes at least one of a hypertext page and a structured data file.

10. The method of claim 1, wherein the transaction is submitting information taken from a form.

11. The method of claim 1, wherein the cryptographic parameters include at least one cryptographic key.

12. The method of claim 11, wherein the at least one cryptographic key includes at least one of a public key and a private key.

13. The method of claim 11, further comprising:
receiving a request to establish the cryptographic parameters; and
responsive to receiving the request, performing the establishing step.

14. The method of claim 1, further comprising:
notifying the inline crypto engine of the cryptographic parameters.

15. The method of claim 1, further comprising:
receiving the transmitted data from the network by the inline crypto engine.

16. The method of claim 1, further comprising:
transmitting the transmitted data to the network by the inline crypto engine.

17. The method of claim 1, wherein the unencrypted data is a request to perform the transaction.

18. A computer program product in at least one computer readable medium for servicing secure transactions in a network, comprising instructions for:
establishing cryptographic parameters in a handshake engine;
servicing a transaction in a transaction server using unencrypted data;
utilizing an inline crypto engine and the cryptographic parameters established by the handshake engine to perform at least one of encryption associated with transmitted data and decryption associated with transmitted data, the inline crypto engine having capability for performing at least one of encryption and decryption of data;
wherein the instructions for establishing include instructions for handing off a network connection from the transaction server to the handshake engine such that the handshake engine can establish the cryptographic parameters with a client coupled to the network.

19. The computer program product of claim 18, wherein the inline crypto engine performs decryption on the transmitted data to obtain the unencrypted data.

20. The computer program product of claim 18, wherein the inline crypto engine performs encryption on the unencrypted data to obtain the transmitted data.

21. The computer program product of claim 18, wherein the instructions for servicing include instructions for handing off a network connection from the handshake engine to the transaction server.

22. The computer program product of claim 18, wherein the instructions for establishing include instructions for performing a Secure Sockets Layer (SSL) handshake procedure.

23. The computer program product of claim 18, wherein the instructions for establishing include instructions for performing a Transport Layer Security handshake procedure.

24. The computer program product of claim 18, wherein the transaction is returning at least one of a data file and steaming data.

25. The computer program product of claim 24, wherein the streaming data includes at least one of audio data and video data.

26. The computer program product of claim 24, wherein the data tile includes at least one of a hypertext page and a structured data file.

27. The computer program product of claim 24, wherein the transaction is submitting information taken from a form.

28. The computer program product of claim 18, wherein the cryptographic parameters include at least one cryptographic key.

29. The computer program product of claim 28, wherein the at least one cryptographic key includes at least one of a public key and a private key.

30. The computer program product of claim 28, further comprising instructions for:
receiving a request to establish the cryptographic parameters; and
responsive to receiving the request, performing the establishing step.

31. The computer program product of claim 18, further comprising instructions for:
notifying the inline crypto engine of the cryptographic parameters.

32. The computer program product of claim 18, further comprising instructions for:
receiving the transmitted data from the network by the inline crypto engine.

33. The computer program product of claim 18, further comprising instructions for:
transmitting the transmitted data to the network by the inline crypto engine.

34. The computer program product of claim 18, wherein the unencrypted data is a request to perform the transaction.

35. The computer program product of claim 18, wherein the unencrypted data is a hypertext page.

36. A distributed data processing system for servicing secure transactions in a network, comprising:
at least one inline crypto engine in communication with the network, wherein the at least one inline crypto engine includes at least one processor for performing at least one of encryption and decryption of data;
at least one transaction server in communication with the at least one inline crypto engine, wherein the at least one transaction server includes at least one processor; and
at least one handshake engine in communication with the at least one transaction server and the at least one inline crypto engine, wherein the at least one handshake engine includes at least one processor, wherein the at least one handshake engine establishes cryptographic parameters, the transaction server services a transaction using unencrypted data, and the at least one inline crypto engine utilizes the cryptographic parameters established by the handshake engine to perform at least one of encryption associated with the transmitted data and decryption associated with transmitted data;

wherein establishing the cryptographic parameters includes handing off a network connection from the at least one transaction server to the at least one handshake engine such that the handshake engine can establish the cryptographic parameters with a client coupled to the network.

37. The distributed data processing system of claim 36, wherein the at least one inline crypto engine performs decryption on the transmitted data to obtain the unencrypted data.

38. The distributed data processing system of claim 36, wherein the at least one inline crypto engine performs encryption on the unencrypted data to obtain the transmitted data.

39. The distributed data processing system of claim 36, wherein servicing the transaction includes handing off a network connection from the at least one handshake engine to the at least one transaction server.

40. The distributed data processing system of claim 36, wherein establishing the cryptographic parameters includes performing a Secure Sockets Layer (SSL) handshake procedure.

41. The distributed data processing system of claim 36, wherein establishing the cryptographic parameters includes performing a Transport Layer Security handshake procedure.

42. The distributed data processing system of claim 36, wherein the transaction is returning at least one of a data file and streaming data.

43. The distributed data processing system of claim 42, wherein the streaming data includes at least one of audio data and video data.

44. The distributed data processing system of claim 42, wherein the data file includes at least one of a hypertext page and a structured data file.

45. A method for using the distributed data processing system of claim 38, comprising steps of:

receiving, from a client coupled to the network, a request by one inline crypto engine of the at least one inline crypto engine;

determining whether the received request is encrypted;

if the received request is encrypted, decrypting the received request by the one inline crypto engine and passing the decrypted received request to one transaction server of the at least one transaction server;

if the received request is not encrypted, passing the received request to the one transaction server;

determining whether a handshake procedure must be performed, and if so, handing off a network connection from the one transaction server to one handshake engine of the at least one handshake engine such that the one handshake engine can establish the cryptographic parameters with the client.

46. The distributed data processing system of claim 36, wherein the cryptographic parameters include at least one cryptographic key.

47. The distributed data processing system of claim 46, wherein the at least one cryptographic key includes at least one of a public key and a private key.

48. The distributed data processing system of claim 46, wherein the at least one transaction server receives a request to establish the cryptographic parameters; and responsive to the at least one transaction server's receiving the request, the at least one handshake engine performs the establishing step.

49. The distributed data processing system of claim 36, wherein the at least one handshake engine notifies the inline crypto engine of the cryptographic parameters.

50. The distributed data processing system of claim 36, wherein the unencrypted data is a request to perform the transaction.

51. The distributed data processing system of claim 36, further comprising a network dispatcher coupled between the at least one inline crypto engine and the at least one transaction server.

52. The distributed data processing system of claim 36, wherein the at least one transaction server, the at least one inline handshake engine, and the at least one inline crypto engine operate concurrently.

53. The distributed data processing system of claim 36, wherein the at least one transaction server, the at least one inline handshake engine, and the at least one inline crypto engine operate asynchronously.

* * * * *

UNITED STATES PATENT AND TRADEMARK OFFICE
CERTIFICATE OF CORRECTION

PATENT NO. : 7,085,923 B2  Page 1 of 1
APPLICATION NO. : 09/874813
DATED : August 1, 2006
INVENTOR(S) : Mraz It is certified that error appears in the above-identified patent and that said Letters Patent is hereby corrected as shown below:

Col. 4, line 9: before "bus" delete "(PCD" and insert --(PCI--.

Col. 12. line 23: after "data" delete "tile" and insert --file--.

Col. 13, line 47: after "claim" delete "38" and insert --36--.

Signed and Sealed this

Nineteenth Day of December, 2006

JON W. DUDAS
*Director of the United States Patent and Trademark Office*